Aug. 25, 1964  M. A. McFADYEN  3,146,001
SAFETY ATTACHMENT FOR TRACTORS
Filed Feb. 14, 1963  2 Sheets-Sheet 1
Fig. 1
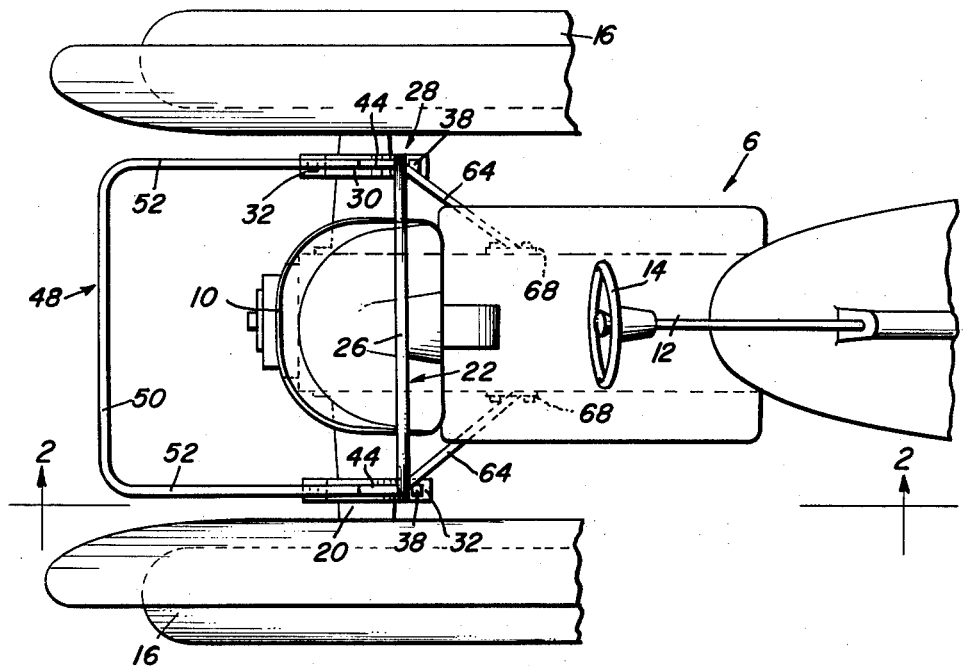
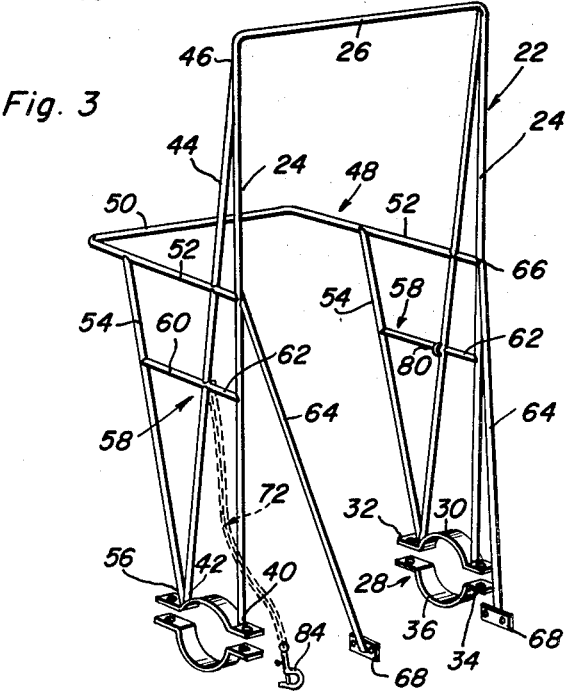
Fig. 3
May Adele McFadyen
INVENTOR.
BY Clarence A. O'Brien
and Harvey B. Jacobson
Attorneys Aug. 25, 1964   M. A. McFADYEN   3,146,001
SAFETY ATTACHMENT FOR TRACTORS
Filed Feb. 14, 1963   2 Sheets-Sheet 2

May Adele McFadyen
INVENTOR.

United States Patent Office 3,146,001
Patented Aug. 25, 1964

3,146,001
SAFETY ATTACHMENT FOR TRACTORS
May Adele McFadyen, Box 42, Anadarko, Okla.
Filed Feb. 14, 1963, Ser. No. 258,543
9 Claims. (Cl. 280—150)

This invention relates to mechanical-type safety appliances and multipurpose safeguards which are, generally speaking, associated with farm tractors in particular and has reference, more particularly stated, to an appropriate safety belt for the tractor operator and novel structural frame means on the frame of the tractor whose component parts or members serve to effectually anchor and support the belt, and what is equally important, cooperate with each other in defining a protective shield for the tractor operator and also a roll-over guard for the tractor.

There has always been, and doubtless will continue to be, a constant need for safeguards in respect to the handling of farm tractors. With a view toward meeting the individual needs of many different types of operators inventors engaged in the field of endeavor under consideration have devised and offered many and varied types and styles of safety appliances with a view toward affording an acceptable degree of protection for both the driver and the tractor. Such diversified adaptations have been found to be helpful and useful in that they offer to make the operator of such vehicles more independent and self-reliant for his own particular needs. It follows that it is a general objective in the instant effort to advance the art through the medium of the herein disclosed invention and to make available to prospective and discerning users a construction and arrangement which ensures greater safety and usefulness, optimum efficiency to all concerned and should prove out to be desirable from a standpoint of simplicity in construction and desirable, economically speaking, from a standpoint of manufacturers, wholesalers, retailers and users.

Persons conversant with the art to which the invention relates are also aware that despite the many and varied patents which have been granted on protective-type safety attachments and the like the latter have apparently not met with widespread adoption and use. As a matter of fact it is known that many deaths on tractor-equipped farms are traceable to tractors which have rolled over or were upset because of difficulties in traversing irregular and muddy terrain and inclinations. It is also noticeable, strange as it seems, that few if any tractor-drivers are resorting to advocated use of accident reducing safety belts.

With the above general observations in mind it will be evident, as hereinafter more clearly set forth, that one objective is to provide the tractor-operator with a safety belt which is to be applied and used when occupying the usual driver's seat. In carrying out this aspect of the concept and instead of using customary fabric, leather or similar combination-of-materials belts the one herein revealed comprises a chain which has at least one end free and equipped with a snap fastener or equivalent quick attachable retaining means and which is separably connectible with a stationary keeper eye provided therefor.

Another object of the invention is to provide means, such as is not now available on present day tractors, which serves to accommodatingly support the chain-type or equivalent safety belt. A belt such as that herein disclosed and claimed is further desirable in that it lends itself to practical outdoor use in that the component parts are made of noncorrodible, weather-resisting metal or equivalent material.

Of equal significance and importance is the means for accommodatingly supporting the chain-belt. This means is characterized, briefly construed, by a rugged openwork frame structure, that is, a structure which is characterized chiefly by a main vertical frame at the front, an auxiliary complemental horizontal frame which is attached to the main frame and disposed rearwardly thereof, and means for interconnecting and rigidifying the two frames to thus provide an overhead protective shield or guard constituting tractor protecting rollover means and also a shield which encages the operator if and when accident overturning occurs.

Also and with a view toward providing an explanatory background for the instant matter it seems well to point out here that the overhead protector-type frame structure (or openwork framework) is such in construction and design that the forwardmost portion thereof does not extend forwardly of the leading or forward edge portion of the vehicle seat. Accordingly, it allows the vehicle operator to unsnap the safety chain, stand erect on the vehicle in front of the seat without encountering interference from or in connection with the stated overhead structure. Mentioning this aspect of the overall concept is deemed significant because, as the tractor driver knows, it is sometimes unavoidably necessary to stand up in order to make certain observations, as is done in connection with farm vehicles, and particularly farm tractors.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view showing a fragmentary portion of a conventional-type farm tractor which is equipped with the safety attachment as constructed in accordance with the principles of the present invention;

FIGURE 3 is a view in perspective of the complete ready-to-install safety attachment.

Figure 2:
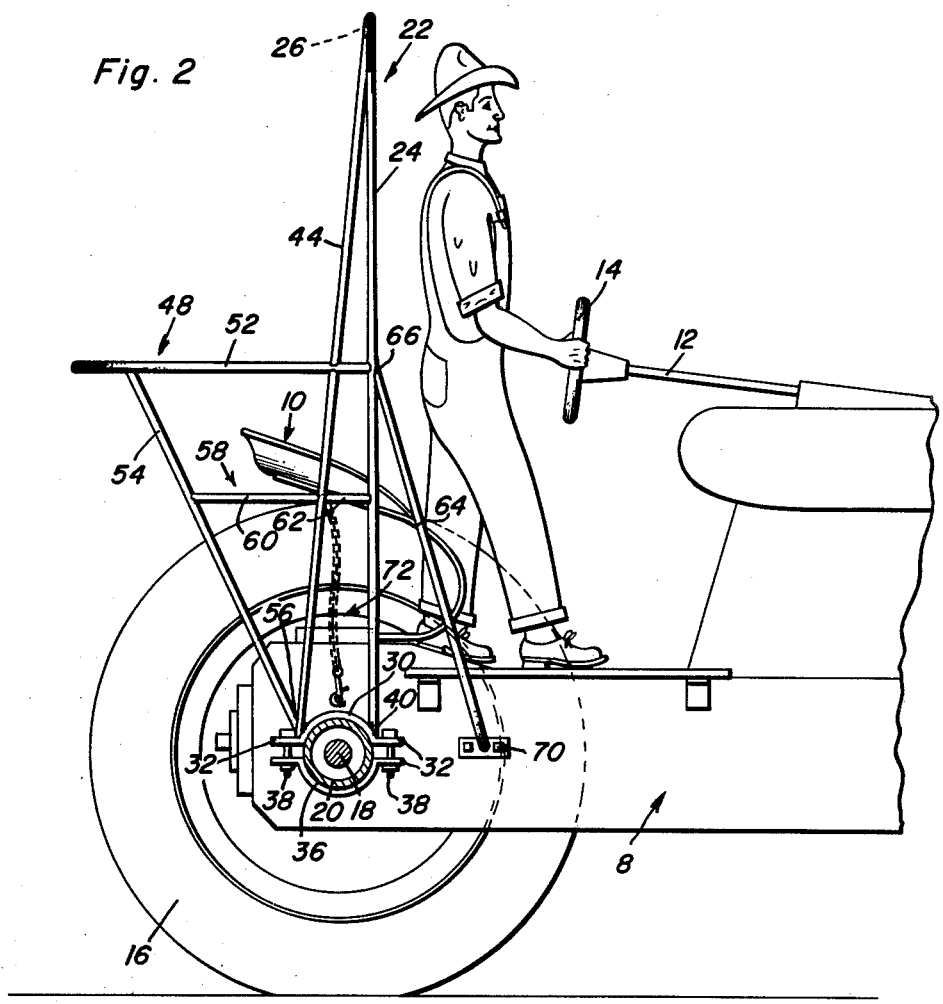
FIGURE 2 is a view, with portions in section, taken on the plane of the longitudinal section line 2—2 of FIG. 1.

With reference to FIGS. 1 and 2 it will be evident that the tractor is denoted in a general manner by the numeral 6. Insofar as the invention is concerned the drawings need show only the frame structure of the chassis or the so-called chassis frame 8, the operator's conventional seat 10, the steering post or column 12 and the steering wheel 14 which is in front of and in alignment with the seat. The disclosure also includes suitable rear wheels 16 supporting the rear end portion of the chassis frame, axles 18 therefor and a complemental axle housing 20.

The "attachment" is characterized by the frame structure on the one hand and the safety belt on the other hand. Taking up the frame structure first and interpreting the same as a ready-to-install attachment it will be seen from FIG. 3 that it is of a simplified consolidated or one-piece construction. The component parts are preferably lightweight but strong structural tubing. The principal component part of this structural unit (alternatively referred to as an openwork framework) is the vertically elongated upstanding inverted U-shaped frame 22. This frame is characterized by a pair of depending limbs 24, the upper ends being joined by a horizontal or bight portion 26. With reference now to the anchoring and clamping means for the framework it will be seen that two two-part or sectional clamps are provided and that each clamp is the same in construction and is denoted generally by the numeral 28. The upper part or section comprises a semi-circular band 30 having terminal apertured ears 32 opposed to complemental ears 34 on the semi-circular band 36. The band 30 may be designated as the top band and the other one as the bottom band or section. The respective ears are aligned and joined together with nut-equipped bolts 38 as shown with greater particularity in FIG. 2. FIG. 2 shows also how these clamps are connected to the axle housing embraced thereby. The reason for introducing the clamps at this point in the description is to bring out the fact that the extreme lower ends 40 are joined to the forward end portions of the clamps and that the corresponding lower ends 42 of the complemental rearwardly and downwardly inclined struts 44 are connected to the rearward end portions of the clamps and have their upper end portions 46 integrally joined with the upper ends of the limbs 24. Actually in end elevation as shown in FIG. 2 each limb 24 and its stabilizing strut 44 provides an inverted V-shaped upright. The frame structure is also characterized by an auxiliary complemental horizontal U-shaped frame 48 which has a rearwardly disposed bight portion 50 and forwardly extending companion arms 52 the forward ends thereof being conjointly connected with median portions of the limbs 24 and 44 as illustrated. This U-frame 48 is also stabilized or reinforced by the forwardly and downwardly inclined stabilizing struts 54. The upper ends are connected to the median portions of the arms 52 and the lower end portions 56 converge toward and join with the lower end portions 42 of the first-named struts 44. For further strength and rigidity horizontal braces 58 are provided. Each brace has horizontal component portions 60 and 62 which are joined in such a way that they are integrated with the limbs 24, struts 44 and struts 54.

It is further desired to equalize the stress and strain factors by guarding against undue forward displacement of the framework made up of the U-frames 22 and 48. To accomplish this holddown rods or links 64 are provided, one for each limb 24. In fact, the upper ends 66 are joined to the median portions of the limbs 24 at junctural connection of the arms 52 therewith. In other words, the connecting points 66 are in line with the forward ends of the arms 52 where they are joined to the median portions of the limbs 24. These holddown rods or links 64 converge forwardly and downwardly and terminate at their lower ends in attaching heads, each head comprising a simple cleat 68. These cleats are disposed opposite each other and are bolted or otherwise connected as at 70 (FIG. 2) with the side members of the chassis frame 8.

It is important to note that the adequately stabilized U-shaped or U-frame 22 is located in a vertical plane rearwardly of the leading or forward edge portion of the seat means 10. The width of the frame is such that the limbs adequately straddle the seat means 10 and accordingly provide the desired safeguarding means for the driver or operator of the tractor. The manner is which the two U-frames 22 and 48 are interconnected with each other with braces ensures satisfactory distribution of stresses and strains in the attachment considered as an entity. The top plan dimension of the U-frame 48 is such that the bight portion 50 reaches to a position which is above or preferably rearwardly of the rear peripheral portion of the ground-engaging wheels 16 whereby to utilize the U-frame 48 as a rear tilt guard and the U-frame 22 as a rollover guard. The means of attachment of the vehicle would vary as such as does the make and model of vehicles on which this device is to be used. However, in all cases the means of attachment would be engineered with a high safety factor at the appropriate points of attachment. Further, engineering shall make possible the attachment of this device to any suitable vehicle, simply by bolts and clamps, and thereby eliminating drilling or punching of holes on the vehicle. The drawings show a typical installation, however, the attachment to specific vehicles can be engineered in keeping with the manufacturer's requirements.

Figure 4:
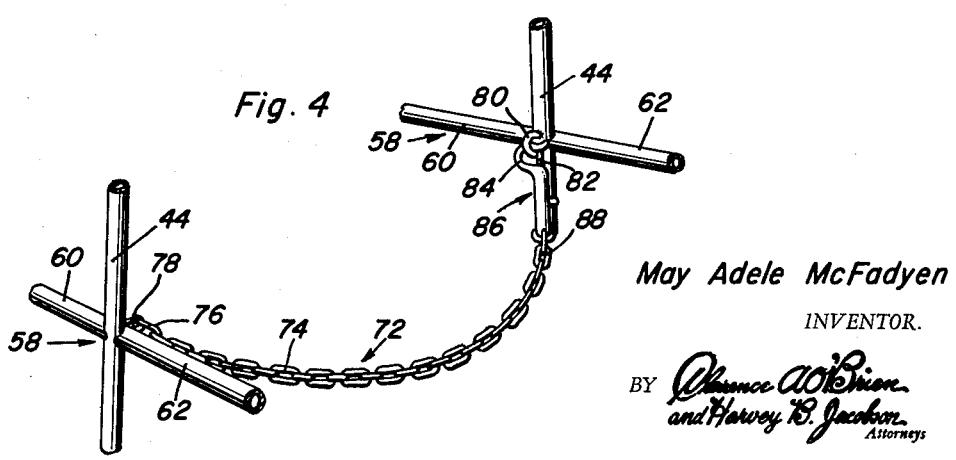
FIGURE 4 is an enlarged detail view in elevation detailing the chain-type safety belt.

With respect now to the aforementioned safety seat belt this is denoted by the numeral 72. Because the belt is for outdoors use it is not constructed, as are most vehicle safety belts, of fabric, leather, or a combination of such materials but is preferably in the form of a chain made up of non-corrodible links 74. One end 76 of the chain is attached to an anchoring staple 78 which is provided therefor at the juncture of the component parts 44, 60 and 62, as illustrated at the left in FIG. 4. A similar staple is provided at a corresponding place to the right in FIG. 4 and this one constitutes a keeper eye 80 for the spring loaded latch 82 on the hook end 84 of the snap fastener 86 carried by the free end portion 88 of the chain.

The manner of constructing, installing and using the invention structure is clear from the instant disclosure. Also the features and advantages of the readily accessible safety belt are equally clear. Under the circumstances a more extended explanation is thought to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a tractor embodying a chassis frame characterized by a rearward portion provided with an operator's seat and forwardly of and adjacent to and in alignment with a complemental steering wheel and steering column carrying said wheel, axle means provided at ends thereof with ground engaging wheels and including axle housings, an inverted U-frame disposed in an upstanding vertical position and constituting an arch and including an upper bight portion connecting upper ends of depending limbs, said limbs connected at lower ends thereof to clamping devices embracing longitudinally spaced portions of the axle housings inwardly of the respectively adjacent wheels, said limbs straddling the seat with the bight portion spaced in a plane above the plane of the seat, said U-frame being in a vertical plane rearwardly spaced from the forward leading edge of the seat, and stabilizing struts connected at upper end portions to corresponding upper ends of the limbs of the U-frame and depending therefrom and connected at their lower ends to rearward end portions of the cooperating clamping devices.

2. The structure defined in claim 1 and in combination, a pair of forwardly and downwardly inclined stabilizing rods connected at upper ends to cooperating portions of said limbs and provided at lower ends with attaching members, said rods constituting linking connections between the limbs and chassis frame, and the lower ends of said rods being rigidly secured to oppositely disposed portions of members of said chassis frame.

3. The structure defined in claim 1 and in combination, a second U-frame having a rearward bight portion and opposed horizontal arms, said U-frame being disposed at right angles to the first-named U-frame and the arms thereof being connected at forward end portions to the intermediate portions of the limbs of the first-named U-frame.

4. The structure defined in claim 1 and in combination, a second U-frame having a rearward bight portion and opposed horizontal arms, said U-frame being disposed at right angles to the first-named U-frame and the arms thereof being connected at forward end portions to the intermediate portions of the limbs of the first-named U-frame, downwardly and forwardly inclined stabilizing struts rigidly connected at upper ends to intermediate portions of the respective arms and having lower ends merging into and connected with the lower end portions of the first-named struts at their junctional connecting points with the associated clamping devices.

5. The structure defined in claim 1 and in combination, a second U-frame having a rearward bight portion and opposed horizontal arms, said U-frame being disposed at right angles to the first-named U-frame and the arms thereof being connected at forward end portions to the intermediate portions of the limbs of the first-named U-frame, downwardly and forwardly inclined stabilizing struts rigidly connected at upper ends to intermediate portions of the respective arms and having lower ends merging into and connected with the lower end portions of the first-named struts at their junctional connecting points with the associated clamping devices, and in combination a pair of rigid stabilizing rods connected at upper ends to their respective limbs and provided at lower ends with attaching heads secured to said chassis frame, said rods constituting rigidifying and linking connections between the chassis frame and the limbs of the first-named U-frame.

6. The structure defined in claim 5 and in combination a safety chain rigidly connected at one end to one of the first-named struts and having its opposite end free and provided with a spring-loaded latch separably connectible with a keeper provided therefor on a median portion of the remaining one of the first-named struts.

7. In combination, a tractor embodying a chassis frame characterized by a rearward portion provided with an operator's seat and forwardly of and adjacent to and in alignment with a complemental steering wheel and steering column carrying said wheel, axle means provided at ends thereof with ground engaging wheels and including axle housings, an inverted U-frame disposed in an upstanding vertical position and constituting an arch and including an upper bight portion connecting upper ends of depending limbs, said limbs connected at lower ends thereof to clamping devices embracing longitudinally spaced portions of the axle housings inwardly of the respectively adjacent wheels, said limbs straddling the seat with the bight portion spaced in a plane above the plane of the seat, said U-frame being in a vertical plane rearwardly spaced from the forward leading edge of the seat, said U-frame being of a vertical height that said bight portion is disposed in a predetermined plane well above the plane of said seat whereby to allow the occupant of the seat to stand beneath or forwardly of the bight portion whenever necessary or desired, stabilizing struts having lower ends rigidly connected to rearward end portions of their respectively cooperating clamping devices and upper end portions joined rigidly to the respectively cooperating limbs of said U-frame, a second U-frame disposed in a horizontal plane at right angles to said first-mentioned U-frame and having a bight portion situated rearwardly of said ground-engaging wheels and arms with their forward ends joined to median portions of the limbs of said first-named U-frame, said second U-frame being disposed in a plane above the plane of said seat and being reinforced by stabilizing means connected to said struts.

8. The structure according to claim 7 and, in combination, a chain-type safety belt having one end connected to a median portion of one of said struts and its opposite end releasably connected to a portion of the other strut in an easy-to-reach position relative to said seat.

9. A safety-type driver encaging attachment for a tractor comprising a pair of axle-embracing clamping devices, a first inverted U-frame embodying an elevated horizontal bight portion and vertical limbs depending from said bight portion and having their lower ends rigidly joined to their respectively cooperable clamping devices, rearwardly and downwardly inclined stabilizing struts joined at upper ends to upper portions of said limbs and at lower ends to said clamping devices, a second U-frame disposed in a horizontal plane below the plane of said bight portion and above the plane of said clamping devices and embodying a rearwardly disposed bight portion spaced rearwardly from and spanning the space between said limbs, and forwardly extending arms joined at their forward ends to median portions of said struts and also said limbs, forwardly and downwardly inclined reinforcing struts auxiliary to said first-named struts and joined at upper ends to said arms and at lower ends to said clamping devices, and a safety belt having one end anchored on one of said stabilizing struts and the other end detachably connected to the other stabilizing strut.

References Cited in the file of this patent

UNITED STATES PATENTS

| 2,740,642 | Atwood | Apr. 3, 1956 |
| 2,785,002 | Schumaker | Mar. 12, 1957 |
| 2,814,336 | Manhart et al. | Nov. 26, 1957 |
| 2,921,799 | Hatten | Jan. 19, 1960 |

FOREIGN PATENTS

| 700,743 | France | Jan. 2, 1931 |
| 97,363 | Norway | Jan. 16, 1961 |